(12) United States Patent
Druart et al.

(10) Patent No.: US 10,054,773 B2
(45) Date of Patent: Aug. 21, 2018

(54) WIDE-FIELD INFRARED IMAGING SYSTEM

(71) Applicant: Office National d'Études et de Recherches Aérospatiales (ONERA), Palaiseau (FR)

(72) Inventors: Guillaume Druart, Palaiseau (FR); Tatiana Grulois, Massy (FR); Nicolas Guerineau, Antony (FR); Joël Deschamps, Marcoussis (FR)

(73) Assignee: Office National d'Études et de Recherches Aérospatiales (ONERA), Palaiseau (FR)

(*) Notice: Subject to any disclaimer, the term of this patent is extended or adjusted under 35 U.S.C. 154(b) by 0 days.

(21) Appl. No.: 15/538,872

(22) PCT Filed: Dec. 21, 2015

(86) PCT No.: PCT/EP2015/080777
§ 371 (c)(1),
(2) Date: Jun. 22, 2017

(87) PCT Pub. No.: WO2016/102453
PCT Pub. Date: Jun. 30, 2016

(65) Prior Publication Data
US 2017/0371135 A1    Dec. 28, 2017

(30) Foreign Application Priority Data
Dec. 22, 2014 (FR) .................................... 14 63070

(51) Int. Cl.
*G02B 13/14* (2006.01)
*H04N 5/33* (2006.01)
(Continued)

(52) U.S. Cl.
CPC ............ *G02B 13/14* (2013.01); *G01J 1/4228* (2013.01); *G02B 5/208* (2013.01); *H04N 5/23238* (2013.01); *H04N 5/33* (2013.01)

(58) Field of Classification Search
CPC .......... G02B 13/14; G02B 5/208; H04N 5/33; H04N 5/23238; G01J 1/4228
See application file for complete search history.

(56) References Cited

U.S. PATENT DOCUMENTS

| 3,492,058 A | 1/1970 | Waldman |
| 8,446,472 B2 * | 5/2013 | Forestier ................ G02B 13/14 348/164 |
| 9,316,541 B2 * | 4/2016 | Druart ...................... G01J 5/10 |

FOREIGN PATENT DOCUMENTS

| WO | WO03/044476 A1 | 5/2003 |
| WO | WO2010/040914 A2 | 4/2010 |

(Continued)

OTHER PUBLICATIONS

International Search Report and Written Opinion for PCT Patent App. No. PCT/EP2015/080777 (dated Mar. 2, 2016) with English language translation of the ISR.

*Primary Examiner* — Behrooz Senfi
(74) *Attorney, Agent, or Firm* — Kenealy Vaidya LLP (57) ABSTRACT

Some embodiments are directed to a wide-field imaging system for the infrared spectral range. The system can include a vacuum chamber that is optically open for the passage of the field rays originating from the scene to be imaged, a cooled dark chamber placed inside the vacuum chamber and provided with a cold diaphragm, an infrared detector placed inside the cooled dark chamber, and a device for optically conjugating the field rays with the detector.

17 Claims, 5 Drawing Sheets

(51) Int. Cl.
*G01J 1/42* (2006.01)
*G02B 5/20* (2006.01)
*H04N 5/232* (2006.01)

(56) References Cited

FOREIGN PATENT DOCUMENTS

| | | |
|---|---|---|
| WO | WO2012/035509 A1 | 3/2012 |
| WO | WO2012/140389 A1 | 10/2012 |

* cited by examiner

WIDE-FIELD INFRARED IMAGING SYSTEM

CROSS REFERENCE TO RELATED APPLICATIONS

This application is a National Phase filing under 35 C.F.R. § 371 of and claims relatedity to PCT Patent Application No.: PCT/EP2015/080777, filed on Dec. 21, 2015, which claims the relatedity benefit under 35 U.S.C. § 119 of French Application No.: 1463070, filed on Dec. 22, 2014, the contents of which are hereby incorporated in their entireties by reference.

BACKGROUND

Some embodiments relate to wide-field imaging.

More specifically, some embodiments relate to a wide-field imaging system for the infrared spectral range including a vacuum chamber that is optically open for the passage of the field rays originating from the scene to be imaged, a cooled dark chamber placed inside the vacuum chamber and provided with a cold diaphragm, an infrared detector placed inside the cooled dark chamber and a device for optically conjugating the field rays with the detector.

A related art system is disclosed in U.S. Pat. No. 4,783,593A related.

In particular, this patent describes an infrared wide-field imaging system including a vacuum chamber that is opened optically by a window which allows the passage of the field rays originating from the scene to be imaged into the vacuum chamber. Furthermore, this system includes a cooled dark chamber placed inside the vacuum chamber and provided with a cold diaphragm, an infrared detector placed inside the cooled dark chamber and a device for optically conjugating the field rays with the detector.

As illustrated in FIG. 3 of the U.S. Pat. No. 4,783,593A, the optical conjugation device mentioned includes a hot lens 16 (which is the camera lens of this device) which is placed outside the vacuum chamber and bears most of the optical power of the imaging system. In particular, the hot lens 16 forms a real intermediate image of the field rays originating from the scene to be imaged on a plane outside the vacuum chamber. The optical conjugation device further comprises a telecentric system for transferring this intermediate image. In particular, this telecentric system comprises a first hot lens 17 outside the vacuum chamber which collimates the rays originating from the plane of the intermediate image, and a second lens 18, called cold lens, inside the cooled dark chamber which focuses the rays collimated by the first hot lens 17 on the detector. The cold lens 18 is placed at a distance from the hot lens 16 greater than the focal length of the hot lens 16 and, furthermore, the distance between the cold diaphragm and the infrared detector of the cooled dark chamber is substantially equal to twice the focal length of the cold lens 18.

The effect of the optical conjugation device mentioned above is to form an intermediate image between the hot lens 16 and the first hot lens 17 of the telecentric system, so as to make it possible to change the field angle of the infrared wide-field imaging system by simply changing the objective lens (the hot lens 16). In particular, it is known that an objective lens with a short focal distance provides a wide field angle. On the other hand, an objective lens with a long focal distance provides a small field angle. Thus, by replacing an objective lens that has a short focal distance with an objective lens that has a long focal distance, the field angle of the imaging system is changed from a wide field angle to a small field angle.

Furthermore, it should be noted that, in the infrared wide-field imaging system of the patent mentioned, any error of positioning of the cold lens 18 in the cooled dark chamber, and therefore an error of the focal length of the system, is corrected by an adjustment of the position of the hot lens 16 relative to the cold lens 18, without requiring intervention on the cold lens 18 inside the vacuum chamber, this vacuum chamber generally being sealed.

However, this related art system presents a number of drawbacks, notably a significant length associated with the number of lenses and with the length of the cooled dark chamber, a high cooling time linked to the significant length of the cooled dark chamber, and a significant sensitivity to the temperature variations of the hot lens 16.

SUMMARY

Some embodiments are directed to a compact wide-field infrared imaging system which makes it possible to effectively correct a positioning error of the cold lens in the cooled dark chamber, without intervening on the cold lens, and which addresses or resolves the drawbacks of the related art mentioned above.

In the following, "lens" should be understood to be a transparent optical component intended to make light converge or diverge. A lens therefore has a non-zero optical power and at least one of its optical refracting surfaces has a non-zero radius of curvature.

The radii of curvature of a lens have an algebraic value. Hereinbelow, the following sign convention will be used: the value of the radius of curvature of the refracting surface is positive if the center of curvature of the refracting surface is situated to the right of the apex of the refracting surface and the value of the radius of curvature of the refracting surface is negative if the center of curvature of the refracting surface is situated to the left of the apex of the refracting surface.

A parallel plate, which does not have optical power and which has two planar faces, is not a lens.

A window is a component which has a function of optical opening and of sealing. A window can be a lens, a parallel plate, etc.

To address or resolve one or more of the drawbacks mentioned above, one wide-field imaging system according to the invention includes a vacuum chamber opened optically by a window for the passage of the field rays originating from the scene to be imaged, a cooled dark chamber placed inside the vacuum chamber and provided with a cold diaphragm, an infrared detector placed inside the cooled dark chamber and a device for optically conjugating the field rays with the detector, the optical conjugation device including at least one convergent cold lens placed inside the cooled dark chamber to focus the field rays on the infrared detector and at least one convergent or divergent hot lens placed outside the cooled dark chamber.

In some embodiments, the convergent cold lens bears most of the optical power, the cold diaphragm is the diaphragm of the optical conjugation device, the hot lens forms a virtual intermediate image situated either upstream of the hot lens, or downstream of the cold lens. In both configurations, the form of the hot lens is such that the absolute value of the difference between the radii of curvature Rg and Rd of the two refracting surfaces of the hot lens is less than or equal to $e(1-1/n)$, where e and n are, respectively, the thickness and the optical index of the hot lens.

Features or particular embodiments that can be used alone or in combination include:

- the hot lens is convergent and is placed at a distance from the cold lens less than the focal length of said hot lens such that the virtual intermediate image is situated downstream of the cold lens (that is to say after the cold lens in the direction of propagation of the field rays), the combination of the hot lens and of the cold lens forming an optical architecture of Petzval type;
- the hot lens is divergent and the virtual intermediate image is situated upstream of the hot lens (that is to say before the hot lens in the direction of propagation of the field rays), the combination of the hot lens and of the cold lens forming an optical architecture of retrofocus type;
- the cold lens has a diameter less than the size of the detector;
- the hot lens is a meniscus (a meniscus being a lens whose two refracting surfaces are spherical and the centers of the spheres are situated on the same side of the plane of the lens);
- the cold lens is a meniscus;
- the cold lens has a planar convex form;
- the planar convex cold lens has a thickness less than a tenth of its diameter;
- the cold lens is a Fresnel lens;
- the Fresnel lens has an order of diffraction greater than 5;
- a spectral filter is placed in the vacuum chamber;
- the spectral filter is placed in the cooled dark chamber upstream or downstream of the cold lens;
- the spectral filter is placed on the cold lens;
- a plate is placed at the level of the cold diaphragm, the aperture of the plate depending on the spectral band used in the wide-field imaging system;
- the detector is a bispectral detector which is sensitive to two different spectral bands;
- the window also has a hot lens function.

To sum up, a fundamental aspect of the invention is that its optical architecture is compatible with a cryogenic environment (existence of a cooled chamber in a vacuum chamber), unlike the architectures of the related art which also have most of the optical power of the optical system borne by their cold lens.

By virtue of the invention, the optical mass to be cooled is very much reduced so as to obtain short cooling times. This reduced optical mass can be obtained by at least one of the following three approaches:

- the minimum number of cold lenses is incorporated (in the example of the figures below, only a single cold lens is used)
- the diameter of the cold lens is reduced regardless of its form (this is therefore valid also in the case of a cold lens which is a Fresnel lens), which reduces the mass to be cooled and therefore the cooling time
- a cold lens which can be very greatly thinned, particularly if it is planar convex, and in a particular embodiment, a spectral filter can be deposited on the planar refracting surface of the planar convex lens thus further reducing the mass to be cooled.

Another advantage of the invention is that the adjustment of the radii of curvature of the hot lens makes it possible to correct a positioning error of the cold lens, which, once incorporated in a sealed vacuum chamber, can no longer be moved.

Moreover, most of the optical power being borne by the cold lens, the imaging system is athermal (that is to say that it is insensitive to temperature variations).

BRIEF DESCRIPTION OF THE FIGURES

The invention will be better understood on reading the following description, given purely as an example, and by referring to the attached figures in which.

DETAILED DESCRIPTION OF EXEMPLARY EMBODIMENTS

The following exemplary embodiments apply for any wide-field imaging system in infrared spectral bands, particularly in the spectral bands II (wavelength between 3 and 5 micrometers) and III (wavelength between 8 and 12 micrometers).

Figure 1:
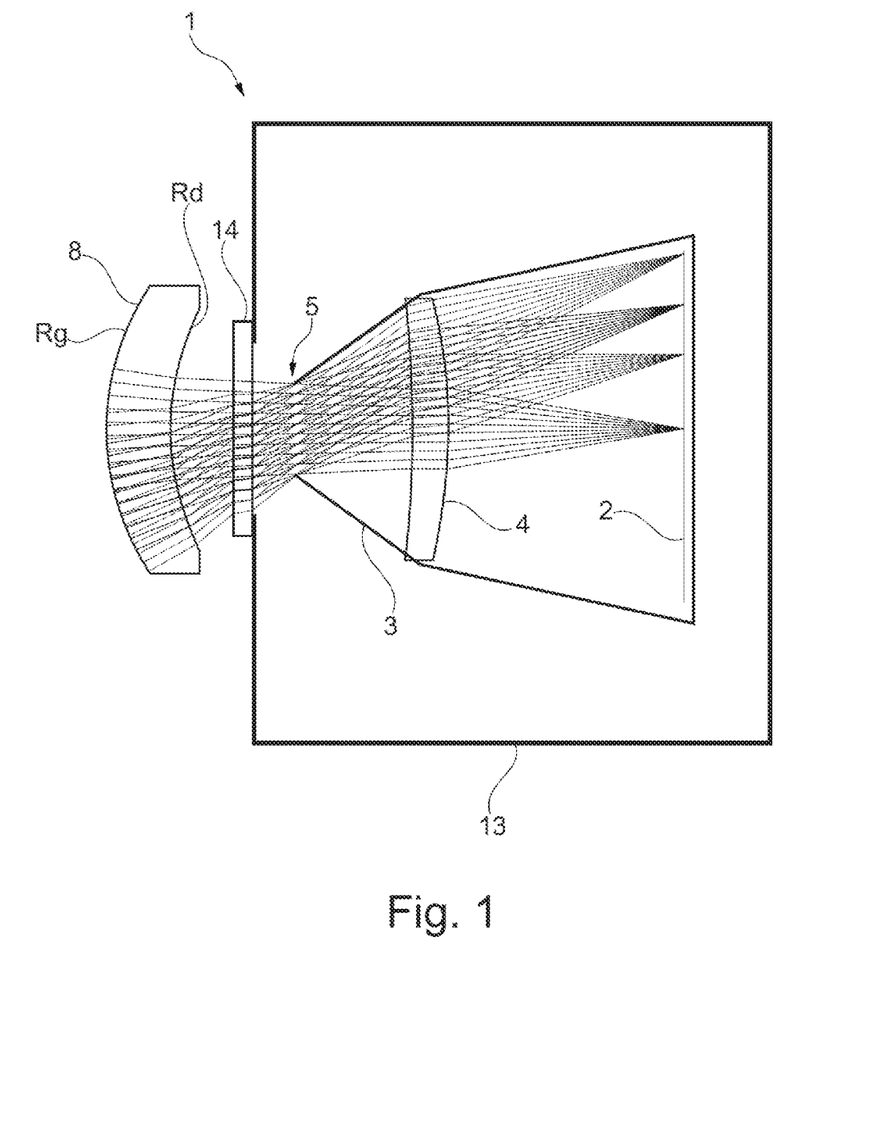
FIG. 1 represents a diagram of an infrared wide-field imaging system according to a first embodiment of the invention.

FIG. 1 represents a wide-field imaging system 1 for the infrared spectral range including a vacuum chamber 13 that is optically open for the passage of the field rays originating from a scene to be imaged situated at infinity (that is to say situated at a distance greater than ten times the focal length, or at a distance such that the wave fronts of the field rays are practically flat). The field rays are by definition the light rays originating from the scene situated at infinity.

In the embodiment of FIG. 1, the vacuum chamber 13 includes a window 14 which makes it possible to optically open the vacuum chamber 13 while ensuring the seal-tightness thereof. In this case, the field rays pass through the window 14 into the vacuum chamber 13.

Furthermore, the wide-field imaging system 1 includes a cooled dark chamber 3 placed inside the vacuum chamber 13 and provided with a cold diaphragm 5. It should be noted that the cooled dark chamber 3 is also known in the related art as "cold shield".

The wide-field imaging system 1 further includes an infrared detector 2 placed inside the vacuum chamber 13.

In one example, the infrared detector 2 is a bispectral detector which is sensitive to two different spectral bands. In another example, the bispectral detector is sensitive to the spectral band II and to the spectral band III.

Furthermore, the wide-field imaging system 1 includes a device for optically conjugating the field rays with the infrared detector 2. This optical conjugation device includes at least one convergent cold lens 4 placed inside said cooled dark chamber 3 to focus the field rays on the infrared detector 2 and at least one convergent hot lens 8 placed outside the cooled dark chamber 3, and more particularly outside the vacuum chamber 13. In another example, the hot lens 8 is divergent.

Advantageously, in the embodiment of FIG. 1, only one convergent hot lens 8 is placed outside the vacuum chamber 13 and only one convergent cold lens 4 is placed in the cooled dark chamber 3, thus making it possible, on the one hand, to reduce the length of the wide-field imaging system 1 and, on the other hand, to reduce the optical mass to be cooled.

Furthermore, in another embodiment (not illustrated in the figures), the window 14 also acts as hot lens 8. In this case, there is no need to place a hot lens 8 upstream of the window 14 (that is to say before the window 14 in the direction of propagation of the field rays), which makes it possible to reduce the length of the wide-field imaging system.

In the embodiment of FIG. 1, the convergent hot lens 8 and the convergent cold lens 4 are meniscuses. In another example not illustrated in the figures, the convergent cold lens 4 has a planar convex form. It should be noted that the form of each lens (hot or cold) is generally optimized to reduce the optical aberrations. In the infrared spectral range, because of the high indices, the optimized forms of the lenses tend to be meniscuses. In the particular case of the convergent cold lens 4 of planar convex form, such a form makes it possible to simplify the production of a lens of reduced thickness, this thickness then being able to have a value less than that given by the engineer's rule of a tenth of its diameter. This reduced thickness makes it possible to minimize the mass of the cold optics to be cooled.

Moreover, it should be noted that the wide-field imaging system 1 of FIG. 1 is a system with optical architecture of Petzval type, characterized by the succession of a first and of a second convergent lens spaced apart sufficiently from one another not to be considered as constituting an optical group. In particular, in this wide-field imaging system 1, the convergent hot lens 8 is placed at a distance from the convergent cold lens 4 less than the focal length of the convergent hot lens 8 and the distance between the cold diaphragm 5 and the infrared detector 2 is substantially equal to the focal length of the convergent cold lens 4. Thus the convergent hot lens 8 forms a virtual intermediate image situated downstream of the convergent cold lens 4. Furthermore, in this wide-field imaging system 1, the cold diaphragm 5 is the diaphragm of the optical conjugation device.

It should be noted that the wide-field imaging system 1 of FIG. 1 has a reduced length by comparison with the length of the U.S. Pat. No. 4,783,593A in which the convergent hot lens is placed at a distance from the cold lens greater than the focal length of the hot lens and in which the distance between the cold diaphragm and the infrared detector is twice the focal length of the cold lens. Furthermore, the fact that, in the case of the configuration of Petzval type of FIG. 1, the distance between the cold diaphragm 5 and the infrared detector 2 of the wide-field imaging system 1 is substantially equal to the focal length of the convergent cold lens 4, makes it possible to have a cooled dark chamber 3 with a length less than that of U.S. Pat. No. 4,783,593A, and thus to have a shorter cooling time.

The distances between the different elements of the optical architecture are defined during an optimization step using an optical design software and there are no simple equations which would give the exact position of these various elements. A person skilled in the art knows how to determine these distances, particularly if it is specified to him or her that it relates to an optical architecture of Petzval type.

In another example not illustrated in the figures, the wide-field imaging system is a system with optical architecture of retrofocus type, characterized by the succession of a divergent first lens followed by a convergent second lens, this convergent second lens being cooled, and this divergent first lens being hot and forming an intermediate image situated upstream of this divergent first lens.

It should be noted that, given the constraints for opening and closing a vacuum chamber, we uncouple the diaphragm from the first lens to place it between the first and the second lens of the optical architecture considered. This makes it possible to place the first lens outside the vacuum chamber while obtaining sufficient space between the first lens and the diaphragm in order to insert a window which will seal the vacuum chamber.

In the particular case where a wide-field imaging system is of Petzval type (see the system of FIG. 1), this is in fact a particular case of architecture in which the second lens (cold lens) has an optical power greater than that of the first lens (hot lens). The concentration of the optical power on the cold lens makes it possible to have a property of athermalization of the optical system despite the presence of the hot lens outside of the vacuum chamber.

It should be noted that, in the wide-field imaging system 1 of FIG. 1, the convergent cold lens 4 bears most of the optical power of the imaging system, that is to say that the focal length of the convergent cold lens 4 is much shorter than the focal length of the convergent hot lens 8. Thus, the wide-field imaging system 1 does not exhibit sensitivity to the temperature variations. In fact, the focal length f of the system is defined from the focal length f1 of the first lens of thickness e and of the focal length f2 of the second lens, through the relation $1/f=1/f1+1/f2-e/f1f2$, therefore to the $1^{st}$ order, since f2>>f1 then, f=f1 and since f1 is athermal, then f does not vary either to the temperature variations. On the contrary, in the imaging system of U.S. Pat. No. 4,783,593A, most of the optical power is borne by the hot lens and thus this system exhibits sensitivity to temperature variations.

It should be noted that the form of the convergent hot lens 8 of the wide-field imaging system 1 is such that the absolute value of the difference between the radii of curvature Rg and Rd of the two refracting surfaces of the convergent hot lens 8 is less than or equal to $e(1-1/n)$, where e and n are, respectively, the thickness and the optical index of the convergent hot lens 8. It should be noted that, in the example where the hot lens 8 is divergent, the form of the divergent hot lens 8 also observes the condition mentioned above for the form of the convergent hot lens 8.

Moreover, as illustrated in FIG. 1, Rg corresponds to the radius of curvature of the left refracting surface of the convergent hot lens 8 since Rd corresponds to the radius of curvature of the right refracting surface of the convergent hot lens 8. The left refracting surface of the convergent hot lens 8 is upstream of the right refracting surface of the convergent hot lens 8, that is to say before the right refracting surface of the convergent hot lens 8 in the direction of propagation of the field rays. It should be noted that a refracting surface is a surface which separates two media of different optical indices, typically a first medium consisting of the material of the lens concerned and a second medium consisting of air.

It has been found that, in the case where the form of the convergent hot lens 8 is such that the absolute value of the difference between the radii of curvature of the two refracting surfaces of the convergent hot lens 8 is less than or equal to e(1−1/n), the focal length of the convergent hot lens 8 becomes very sensitive to a variation of thickness of this lens. In this particular case, the focal length of the convergent hot lens 8 can be adjusted by an adjustment of the thickness of this lens.

It is known that an error of positioning of the cold lens in the cooled dark chamber, and therefore a focusing error, can be corrected by the adjustment of the positioning of the convergent hot lens 8, as is done in U.S. Pat. No. 4,783,593A, or by the adjustment of the focal length of the convergent hot lens 8.

It should be noted that, in the wide-field imaging system 1, it is not possible to completely correct an error of positioning of the convergent cold lens 4 by an adjustment of the positioning of the convergent hot lens 8, as in U.S. Pat. No. 4,783,593A. The reason is that, in the wide-field imaging system 1, most of the optical power of this system is borne by the convergent cold lens 4 and no longer by the hot lens 8, as in U.S. Pat. No. 4,783,593A. Thus, an adjustment of the positioning of the convergent hot lens 8 would not be sufficient to completely correct an error of positioning of the convergent cold lens 4, as is the case in U.S. Pat. No. 4,783,593A.

However, in the wide-field imaging system 1, the correction of an error of positioning of the convergent cold lens 4 in the cooled dark chamber 3 is performed by the adjustment of the thickness of the convergent hot lens 8 with the proviso that the difference between the radii of curvature of the two refracting surfaces of the convergent hot lens 8 must be less than or equal to e(1−1/n).

Advantageously, this difference between the radii of curvature of the two refracting surfaces of the hot lens is non-zero. In effect, the more this difference tends toward zero, the more the focal length of the lens is sensitive to a variation of thickness of this lens to a point where the lens becomes difficult to produce. It is therefore necessary to find a compromise between the sensitivity of the focal length as a function of the thickness and the feasibility of the lens.

It should be noted that a person skilled in the art can adjust the thickness of the convergent hot lens 8 according to the particular case of error of positioning of the convergent cold lens 4 that he or she wants to correct, by replacing the convergent hot lens 8 with another convergent hot lens that has a thickness adjusted to correct this error and also that has a form which observes the condition mentioned above. In the example where the hot lens 8 is divergent, a person skilled in the art can adjust the thickness of the divergent hot lens 8 according to the particular case of error of positioning of the convergent cold lens 4 that he or she wants to correct, by replacing the divergent hot lens 8 with another divergent hot lens that has a thickness adjusted to correct this error and also that has a form which observes the condition mentioned above.

Furthermore, it should be noted that, in the U.S. Pat. No. 4,783,593A, the system has an intermediate image plane between the hot optic and the cold optic. With the field of view being defined, in the configuration of this patent, by the hot optic, it is sufficient to change the focal length of the hot optic to change the field of view. In the present invention, the hot optic and the cold optic form a whole, namely a Petzval objective lens or an objective lens of retrofocus type and one or other of the optics of the architecture cannot be removed without impacting the image quality of the system.

The field angle of the wide-field imaging system 1 can be set in a range between 10° and 90° for an architecture of Petzval type. In the case where the desired field angle is higher (typically between 90° and 180°) than that of a Petzval system, the hot lens is divergent and the cold lens is convergent, the combination of hot lens and cold lens forming an optical architecture of the retrofocus family.

Typically, for a field angle between 10° and 90°, the system is rather a Petzval, with all the well-known effects associated with this type of optical architecture. Such an architecture makes it possible to have a back focal distance (distance between the last cold lens and the detector) substantially equal to half the focal length of the system.

Typically, for a field angle between 90° and 180°, the system is rather a retrofocus, with all the well-known effects associated with this type of optical architecture. Such an architecture makes it possible to have an extension greater than the focal length of the system.

It should be noted however that the families of optical architecture can overlap with respect to the viewing field angle.

From the above, it is clear that the wide-field imaging system 1 makes it possible, in compensation for the non-modifiable field angle, to effectively correct an error of positioning of the cold lens in the cooled dark chamber, and to reduce the length, the cooling time and the sensitivity to temperature variations of the imaging optical systems compared to the related art.

Figure 2:
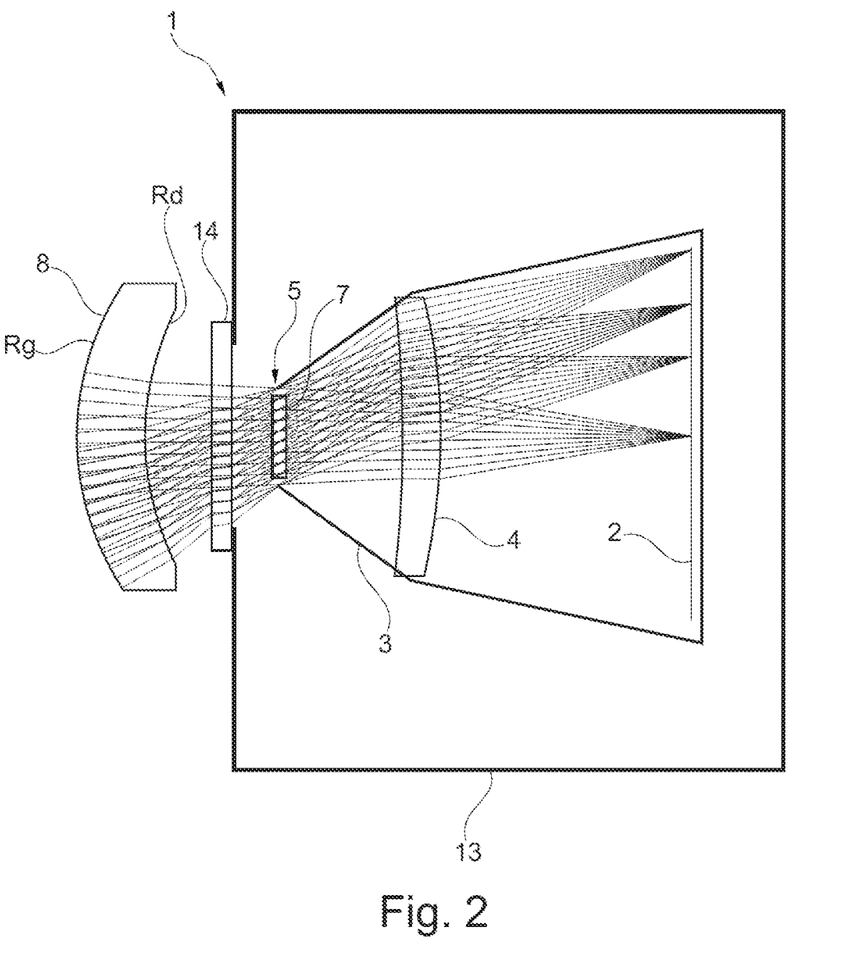
FIG. 2 represents a diagram of an infrared wide-field imaging system according to a second embodiment of the invention where a spectral filter is added.

FIG. 2 illustrates another embodiment of the wide-field imaging system 1 which is identical to the embodiment of FIG. 1, except in that it also comprises a spectral filter 7. The spectral filter 7 can be used to limit the infrared spectral bands to be detected by the infrared detector 2 of the optical system. In one example, the spectral filter 7 is adapted to allow the passage of the field rays of a wavelength which corresponds to the spectral bands II and III.

As illustrated in FIG. 2, the spectral filter 7 is placed at the level of the cold diaphragm 5. However, in another example not illustrated in the figures, the spectral filter 7 is placed in the cooled dark chamber 3 downstream of the convergent cold lens 4, that is to say after the convergent cold lens 4 in the direction of propagation of the field rays. In another example not illustrated in the figures, the spectral filter 7 can be placed in the cooled dark chamber 3 upstream of the convergent cold lens 4, that is to say before the convergent cold lens 4 in the direction of propagation of the field rays.

In the cases mentioned above, the spectral filter 7 is placed along the optical axis of the convergent cold lens 4 inside the cooled dark chamber 3.

However, in another example not illustrated in the figures, the spectral filter 7 is placed along the optical axis of the convergent cold lens 4 outside the cooled dark chamber 3 but still inside the vacuum chamber 13. This mode of operation is however a degraded mode of operation.

Furthermore, in another example, the spectral filter 7 can be placed on one or both of the refracting surfaces of the convergent cold lens 4 of FIG. 2 which is a meniscus (a meniscus being a lens whose two refracting surfaces are spherical, one of the refracting surfaces concave and the other convex, the centers of the spheres being situated on the same side of the plane of the lens).

In another example, the wide-field imaging system 1 is identical to the embodiment of FIG. 2, except in that the convergent cold lens 4 has a planar convex form.

The planar convex form of the convergent cold lens makes it possible to consider a very small thickness of this lens which makes it possible to considerably reduce the mass of the optic to be cooled.

This form also facilitates the deposition of the spectral filter 7 which is generally a multilayer structure. The fact that the spectral filter 7 is placed on the planar refracting surface of the convergent cold lens 4 makes it possible to minimize the optical mass to be cooled by avoiding recourse to a plate dedicated to the spectral filtering.

In another example, the spectral filter 7 is placed on the convex refracting surface of the convergent cold lens 4 which has a planar convex form.

In another example, a spectral filter 7 can be placed on each of the two refracting surfaces of the convergent cold lens 4. An example of a case where that could be advantageous would be a case where the filtering function is complex in which it may be necessary to apply different multilayers on either side of the convergent cold lens 4. In this case, it may therefore be necessary to place multilayers on the convex refracting surface and the planar refracting surface of the convergent cold lens 4 which is a lens of planar convex form.

In another example not illustrated in the figures, the wide-field imaging system is identical to the wide-field imaging system 1 of FIG. 2, except in that the convergent cold lens 4, which has a planar convex form, is a Fresnel lens.

It is well known that, compared to a conventional planar convex lens, the Fresnel lens reduces the optical deflection of the lens by subdividing it into a set of concentric rings of known prismatic section called Fresnel zones. For each of these zones, the thickness is reduced, which means that the overall surface of the lens is no longer uniform but is made up of several surfaces of the same curvature, separated by discontinuities (for example of thickness or of index).

Thus, the advantage of having a convergent cold lens 4 of planar convex form which is a Fresnel lens, instead of having a convergent cold lens 4 of conventional planar convex form, is being able to thin the lens more. Thus, the mass of the convergent cold lens 4 is reduced.

In one example, the Fresnel lens has a high order of diffraction which is greater than 5. This high order of diffraction makes it possible to reduce the axial chromatism compared to that which would be generated by a conventional Fresnel lens with an order of diffraction equal to 1.

The use of a hot lens outside of the vacuum chamber advantageously makes it possible to reduce the diameter of the cold Fresnel lens by allowing the rays at field edge to arrive according to a mean incidence that is inclined relative to the perpendicular of the detector. A reduced Fresnel lens diameter allows the rays at field edge to illuminate fewer discontinuities and the image quality is improved thereby. It should be noted that, in order to limit the shadow effects brought about by the discontinuities, the Fresnelized side of the cold lens is preferably oriented facing the detector.

In another embodiment not illustrated in the figures, a plate is placed at the level of the cold diaphragm 5, the aperture of which depends on the spectral band used in the wide-field imaging system 1. It is known that a plate by definition is a lens with parallel faces. The fact of having a plate at the level of the cold diaphragm 5 makes it possible to find a compromise between the need to have a large aperture for the band III and the possibility of working with a lesser aperture for the band II which makes it possible to limit the amplitude of the aberrations to be corrected and reduce the sensitivity of the system to the errors of fabrication and of positioning of the optical elements in the spectral band II. It is specified that the need mentioned above stems from the fact that the image pattern depends on the wavelength and the aperture, and therefore that, to have a suitable image pattern, in a same elementary surface area centered on a pixel, both in band II and in band III, it is essential for the system in band III to be more open than in band II. Nevertheless, if the aperture of the band III is used for the band II, the system will produce too many optical aberrations in band II and the image quality will be degraded in band II, hence the benefit of having a plate which modifies the aperture according to the spectral band.

It should be noted that the refractive index of the convergent cold lens 4 is preferentially greater than 3. The materials used to produce such a lens can be for example germanium, the index of which is equal to 4, or silicon, the index of which is equal to 3.5. More generally, the lens is preferentially produced in any kind of material with high index. That contributes in fact to improving the performance levels of the system, since they limit the geometrical aberrations by virtue of the high index and the chromaticity aberrations because of their low chromatic dispersion. A high refractive index also makes it possible to reduce the radius of curvature of the convergent cold lens 4 and therefore to produce a thinner lens.

Furthermore, it should be noted that, preferentially, the convergent hot lens 8 is made up of chalcogenide glasses (for example GASIR™ glasses). The refractive index of a lens in Gasir is less sensitive to the temperature variations than the refractive index of a lens in Germanium. Thus, a convergent hot lens in Gasir is less sensitive to the temperature variations than a convergent hot lens in Germanium. Materials whose index varies little with temperature variations and which contract little with temperature variations will therefore preferentially be chosen.

Figure 3A:
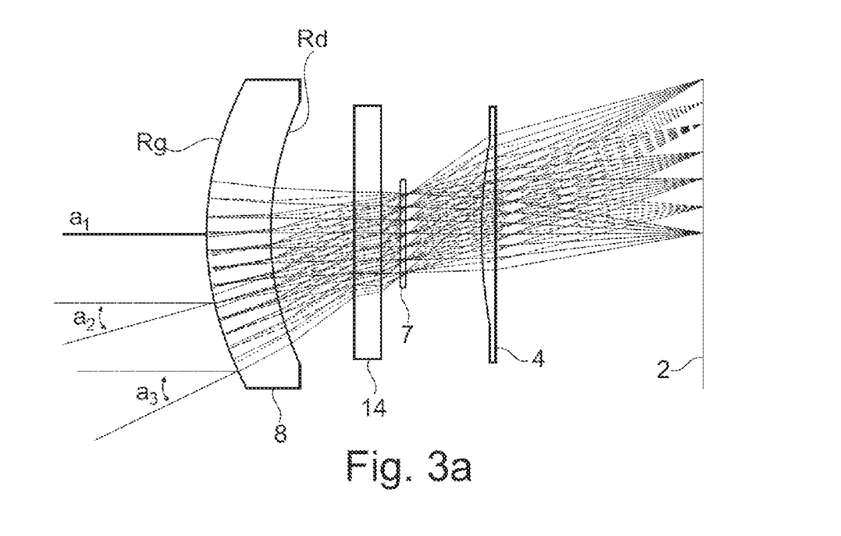
FIG. 3a represents a diagram of an optical system derived from conventional ZEMAX software, this optical system having the same optical architecture as the wide-field imaging system of FIG. 2, except that the convergent cold lens of this optical system is a planar convex lens instead of a meniscus.

FIG. 3a illustrates a diagram of an optical system derived from ZEMAX software well known to those skilled in the art, this optical system having the same optical architecture as the wide-field imaging system of FIG. 2, except that the convergent cold lens 4 of this optical system is a planar convex lens instead of a meniscus. In particular, as illustrated in FIG. 3a, the optical system comprises a convergent hot lens 8, a window 14, a spectral filter 7, a convergent cold lens 4 which is a planar convex lens. The spectral filter 7 is placed at the level of the cold diaphragm as is the case for the spectral filter 7 of FIG. 2. It should be noted that the cooled dark chamber and the vacuum chamber of FIG. 2 are not represented in the diagram of FIG. 3a. Furthermore, the diaphragm of FIG. 3a illustrates field rays originating from the scene to be imaged and forming different field angles a1, a2 and a3.

The main structural quantities of the optical system of FIG. 3a are listed hereinbelow:
Field of view: 57.4°
Footprint: 31.4 mm
Focal length of the system: 31.4 mm
Focal length of the hot lens: 60.5 mm
Radius of curvature Rg of the refracting surface on the scene side of the initial hot lens: 19.251 mm
Radius of curvature Rd of the refracting surface on the detector side of the hot lens: 21.251 mm
Thickness e of the hot lens: 4.17 mm
For the hot lens: the following condition is strictly observed:
(Rg−Rd (=2 mm)<(1−1/n)e≈2.5 mm (with n=2.5)

Focal length of the cold lens: 20.1 mm (it is confirmed that this is close to the focal length of the optical system)
Radius of curvature Rg of the refracting surface on the scene side of the planar convex cold lens: 58.87 mm
Diameter of the cold lens: 16 mm
Thickness of the cold lens: 0.7 mm (less than its diameter/10 which is 1.6 mm)
The cold lens is robust to errors on the thickness.
Hot lens/cold lens distance: 14 mm
Cold diaphragm/detector distance: 18.6 mm FIG. 3b represents a diagram with the optical performance levels of the optical system of FIG. 3a in the case where there is no error of positioning of the convergent cold lens 4.

Figure 3B:
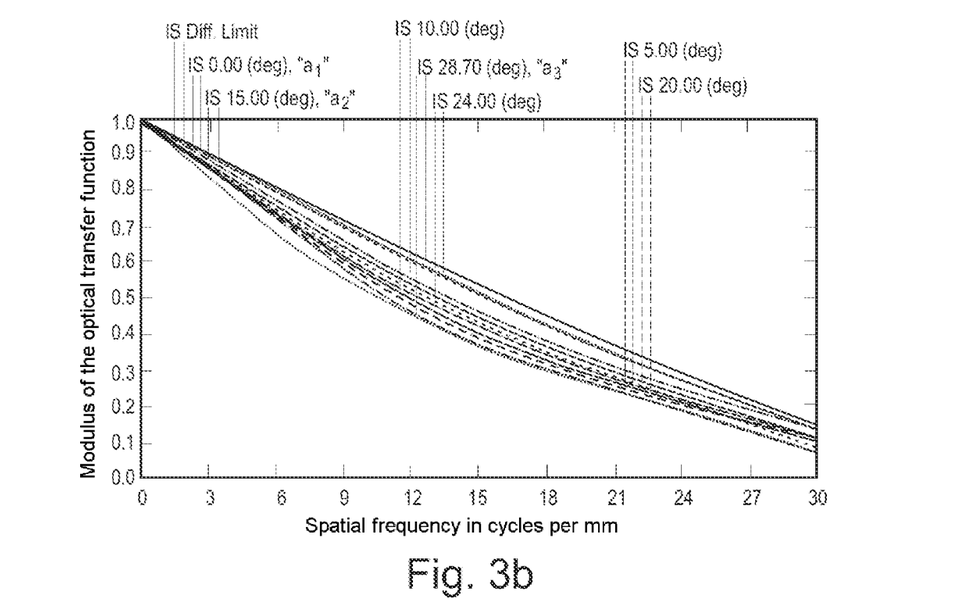
FIG. 3b represents a diagram with the optical performance levels of the optical system of FIG. 3a in the case of a cold lens positioning error.

In particular, the diagram of FIG. 3b illustrates the polychromatic modulation transfer function (MTF) derived from the ZEMAX software. The horizontal axis of the diagram corresponds to the spatial frequencies in cycles per mm and the vertical axis of the diagram corresponds to the modulus of the optical transfer function. The different curves illustrated in the diagram correspond to the different field angles of rays of FIG. 3a and the straight line illustrated in the diagram corresponds to the diffraction limit (see "Diff. Limit" in FIG. 3b). The closer the curves are to the straight line (diffraction limit), the better is the image quality (spatial resolution) of the imaging system. Furthermore, the vertical bars of the diagram of FIG. 3b make it possible to associate each curve with a field angle (see for example the field angles a1, a2 and a3 of FIG. 3a which correspond respectively to the angles of 0 degrees, 15 degrees and 28.70 degrees illustrated in FIG. 3b). In particular, as illustrated in FIG. 3b, the vertical bars correspond either to the sagittal MTF (S) or to the tangential MTF (T).

Figure 4A:
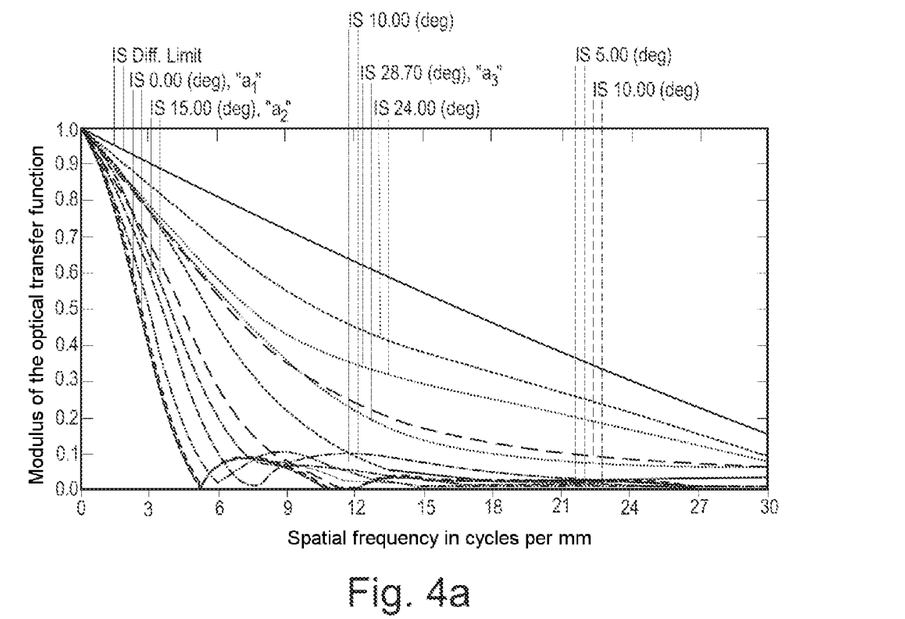
FIG. 4a represents a diagram with the optical performance levels of the optical system of FIG. 3a in the case of a cold lens positioning error of +300 micrometers relative to the detector.

FIG. 4a represents a diagram with the optical performance levels of the optical system of FIG. 3a in the case of an error of positioning of the convergent cold lens of +300 micrometers relative to the detector. In particular, the diagram of FIG. 4a illustrates the polychromatic modulation transfer function (MTF) derived from the conventional ZEMAX software in the case of an error of positioning of the cold lens of +300 micrometers relative to the detector.

As illustrated in FIG. 4a, the different curves are very far away from the straight line which corresponds to the diffraction limit (see "Diff. Limit" in FIG. 4a) and thus the image quality (spatial resolution) of the imaging system is degraded.

Figure 4B:
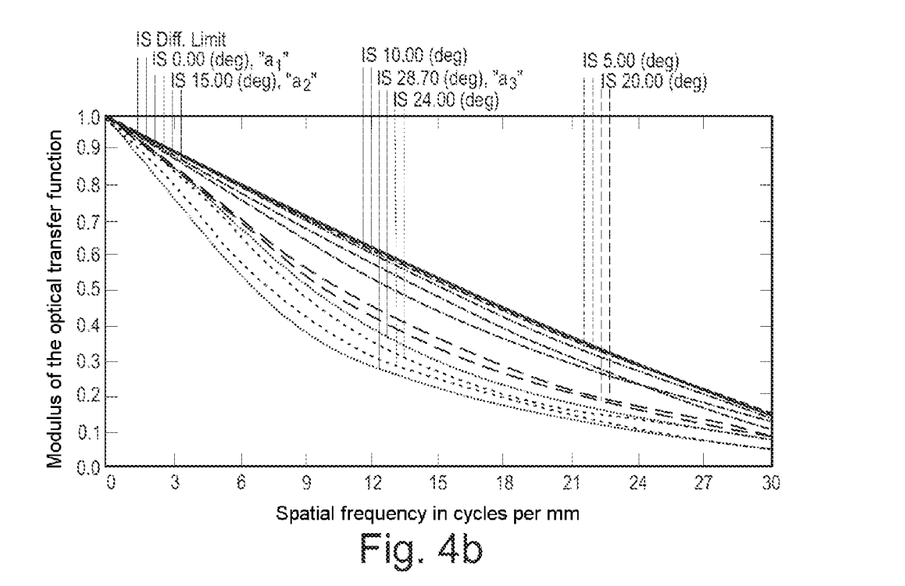
FIG. 4b represents a diagram with the improved optical performance levels of the optical system of FIG. 3a following replacement of the hot lens with another hot lens of appropriate thickness for correcting said cold lens positioning error of +300 micrometers relative to the detector.

FIG. 4b represents a diagram with the improved optical performance levels of the optical system of FIG. 3a following replacement of the hot lens of 4.17 mm thickness with another hot lens of 4 mm thickness suitable for correcting said error of positioning of the cold lens of +300 micrometers relative to the detector. It should be noted that the thickness e of 4 mm of the hot lens replacing the hot lens of thickness e of 4.17 mm clearly observes the condition Rg−Rd (=2 mm)<(1−1/n)e=2.4 mm (with n=2.5).

In FIG. 4b, the different curves are less far away from the straight line which corresponds to the diffraction limit (see "Diff. Limit" in FIG. 4b) compared to the different curves of FIG. 4a which are very far away from the straight line. Thus, the image quality (spatial resolution) following the replacement of the hot lens mentioned above is improved.

Figure 5A:
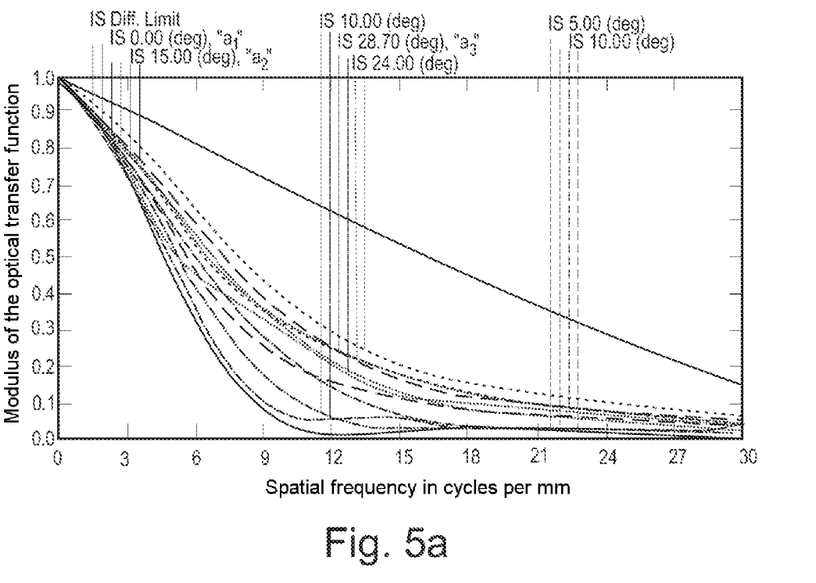
FIG. 5a represents a diagram with the optical performance levels of the optical system of FIG. 3a in the case of a cold lens positioning error of −300 micrometers relative to the detector.

FIG. 5a represents a diagram with the optical performance levels of the optical system of FIG. 3a in the case of an error of positioning of the convergent cold lens of −300 micrometers relative to the detector. In particular, the diagram of FIG. 5a illustrates the polychromatic modulation transfer function (MTF) derived from the conventional ZEMAX software in the case of an error of positioning of the cold lens of −300 micrometers relative to the detector.

As illustrated in FIG. 5a, the different curves are very far away from the straight line which corresponds to the diffraction limit (see "Diff. Limit" in FIG. 5a) and thus the image quality (spatial resolution) of the imaging system is degraded.

Figure 5B:
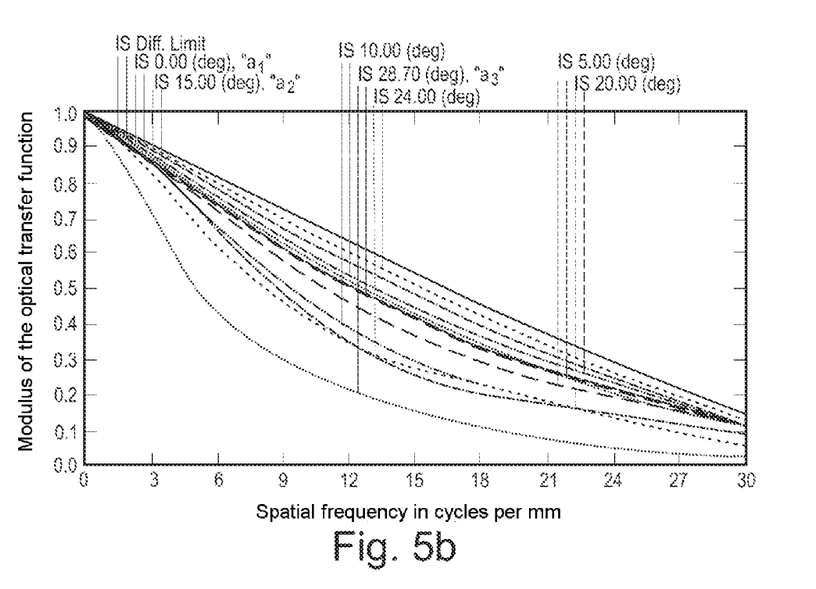
FIG. 5b represents a diagram with the improved optical performance levels of the optical system of FIG. 3a following replacement of the hot lens with another hot lens of appropriate thickness for correcting said cold lens positioning error of −300 micrometers relative to the detector.

FIG. 5b represents a diagram with the improved optical performance levels of the optical system of FIG. 3a following replacement of the hot lens of 4.17 mm thickness with another hot lens of 4.48 mm thickness suitable for correcting said error of positioning of the cold lens of −300 micrometers relative to the detector. It should be noted that the thickness e of 4.48 mm of the hot lens replacing the hot lens of thickness e of 4.17 mm strictly observes the condition Rg−Rd (=2 mm)<(1−1/n)e≈2.6 mm (with n=2.5).

In FIG. 5b, the different curves are less far away from the straight line which corresponds to the diffraction limit (see "Diff. Limit" in FIG. 5b) in comparison with the different curves of FIG. 5a which are very far away from the straight line. Thus, the image quality (spatial resolution) of the imaging system following the replacement of the hot lens mentioned above is improved.

The invention claimed is:

1. A wide-field imaging system for the infrared spectral range comprising:
a vacuum chamber opened optically by a window for the passage of the field rays originating from a scene to be imaged;
a cooled dark chamber provided with a cold diaphragm;
an infrared detector placed inside the cooled dark chamber; and
a device for optically conjugating the field rays with the infrared detector, the device including:
at least one convergent cold lens placed inside the cooled dark chamber to focus the field rays on the infrared detector, and
at least one convergent or divergent hot lens placed outside the cooled dark chamber, wherein:
the convergent cold lens bears most of the optical power;
the cold diaphragm is the diaphragm of the optical conjugation device; and
the hot lens forms a virtual intermediate image situated either upstream of the hot lens, or downstream of the cold lens, and the form of the hot lens is such that the absolute value of the difference between the radius of curvature (Rg) and (Rd) of the two refracting surfaces of the hot lens is less than or equal to e(1−1/n), where e and n are, respectively, the thickness and the optical index of the hot lens.

2. The system as claimed in claim 1, wherein the hot lens is convergent and is placed at a distance from the cold lens less than the focal length of the hot lens such that the virtual intermediate image is situated downstream of the cold lens, the combination of the hot lens and of the cold lens forming an optical architecture of Petzval type.

3. The system as claimed in claim 1, wherein the hot lens is divergent and the virtual intermediate image is situated upstream of the hot lens, the combination of the hot lens and of the cold lens forming an optical architecture of retrofocus type.

4. The system as claimed in claim 1, wherein the cold lens has a diameter less than the size of the detector.

5. The system as claimed in claim 1, wherein the hot lens is a meniscus.

6. The system as claimed in claim 1, wherein the cold lens is a meniscus.

7. The system as claimed in claim 1, wherein the cold lens has a planar convex form.

8. The system as claimed in claim 7, wherein the planar convex cold lens has a thickness less than a tenth of its diameter.

9. The system as claimed in claim 1, wherein the cold lens is a Fresnel lens.

10. The system as claimed in claim 9, wherein the Fresnel lens has a diffraction order greater than 5.

11. The system as claimed in claim 1, wherein a spectral filter is placed in the vacuum chamber.

12. The system as claimed in claim 11, wherein the spectral filter is placed in the cooled dark chamber.

13. The system as claimed in claim 12, wherein the spectral filter is placed on the cold lens.

14. The system as claimed in claim 1, wherein a plate is placed at the level of the cold diaphragm, the aperture of the plate depending on the spectral band used in the wide-field imaging system.

15. The system as claimed in claim 1, wherein the detector is a bispectral detector which is sensitive to two different spectral bands.

16. The system as claimed in claim 1, wherein the window also acts as the hot lens.

17. The system as claimed in claim 1, wherein the form of the hot lens is such that the absolute value of the difference between the radius of curvature (Rg) and (Rd) of the two refracting surfaces of the hot lens is non-zero.

* * * * *